(12) United States Patent
Taware et al.

(10) Patent No.: US 7,743,599 B2
(45) Date of Patent: Jun. 29, 2010

(54) SYSTEM AND APPARATUS FOR GAS TURBINE ENGINE LEAN BLOWOUT AVOIDANCE

(75) Inventors: Avinash Vipayak Taware, Niskayuna, NY (US); Minesh Ashok Shah, Clifton Park, NY (US); Ajai Singh, Clifton Park, NY (US); Willy Steve Ziminsky, Simpsonville, SC (US); Pingchuan Wu, Shanghai (CN)

(73) Assignee: General Electric Company, Schenectady, NY (US)

( * ) Notice: Subject to any disclaimer, the term of this patent is extended or adjusted under 35 U.S.C. 154(b) by 254 days.

(21) Appl. No.: 11/779,127

(22) Filed: Jul. 17, 2007

(65) Prior Publication Data

US 2008/0010966 A1    Jan. 17, 2008

Related U.S. Application Data

(62) Division of application No. 10/930,491, filed on Aug. 31, 2004, now Pat. No. 7,278,266.

(51) Int. Cl.
   *F02G 3/00*    (2006.01)
(52) U.S. Cl. .................................. 60/39.091
(58) Field of Classification Search ............. 60/39.091, 60/39.27, 39.281, 803
   See application file for complete search history.

(56) References Cited

U.S. PATENT DOCUMENTS

| | | | |
|---|---|---|---|
| 5,305,596 A | 4/1994 | Lampe et al. | |
| 5,428,951 A | 7/1995 | Wilson et al. | |
| 5,465,570 A | 11/1995 | Szillat et al. | |
| 5,544,478 A | 8/1996 | Shu et al. | |
| 5,575,144 A | 11/1996 | Brough | |
| 5,598,698 A | 2/1997 | Szillat et al. | |
| 5,706,643 A | 1/1998 | Snyder et al. | |
| 5,916,126 A | 6/1999 | Szillat et al. | |
| 6,302,682 B1 | 10/2001 | Early et al. | |
| 6,973,791 B2 | 12/2005 | Handelsman et al. | |
| 7,089,746 B2 | 8/2006 | Lieuwen et al. | |
| 2005/0274116 A1* | 12/2005 | Thornton et al. | 60/776 |
| 2005/0278108 A1* | 12/2005 | Norman et al. | 701/100 |

\* cited by examiner

*Primary Examiner*—Michael Cuff
*Assistant Examiner*—Andrew Nguyen
(74) *Attorney, Agent, or Firm*—Armstrong Teasdale LLP (57) ABSTRACT

A method of monitoring and controlling the combustion dynamics of a gas turbine engine system is provided. The system includes at least one gas turbine that includes at least one combustor can. The method includes receiving a signal from a gas turbine engine sensor that is indicative of combustion dynamics in at least one of the combustor cans, processing the received signal to determine a probability of lean blowout for at least one combustor can, and controlling the gas turbine engine system to facilitate reducing a probability of a lean blowout (LBO) event using the determined probability of lean blowout.

16 Claims, 8 Drawing Sheets

SYSTEM AND APPARATUS FOR GAS TURBINE ENGINE LEAN BLOWOUT AVOIDANCE

CROSS-REFERENCE TO RELATED APPLICATIONS

This application is a divisional of U.S. patent application Ser. No. 10/930,491, filed Aug. 31, 2004 now U.S. Pat. No. 7,278,266, which is hereby incorporated by reference and is assigned to assignee of the present invention.

BACKGROUND OF THE INVENTION

This invention relates generally to gas turbine engines, and more particularly, to methods and apparatus for controlling the operation of gas turbine engines.

Gas turbine engines typically include a compressor section, a combustor section, and at least one turbine section. The compressor compresses air, which is mixed with fuel and channeled to the combustor. The mixture is then ignited generating hot combustion gases. The combustion gases are channeled to the turbine which extracts energy from the combustion gases for powering the compressor, as well as producing useful work to power a load, such as an electrical generator, or to propel an aircraft in flight.

Gas turbine engines operate in many different operating conditions, and combustor performance facilitates engine operation over a wide range of engine operating conditions. More specifically, stable combustion facilitates preventing engine blowout and providing for engine rated thrust and/or power levels. Furthermore, for gas turbines operated with dry low nitrous oxide (DLN) techniques, combustion stability also facilitates controlling nitrous oxide ($NO_x$) and carbon monoxide (CO) emissions.

At least some known DLN combustion systems utilize premixed fuel and air, and operate at lean fuel/air (F/A) ratios to facilitate reducing $NO_x$ emissions. Lean fuel/air ratios are defined as such if the ratio of fuel to air is below the stoichiometric ratio of fuel to air required for the fuel under consideration. However, a consequence of the lean, premixed operation is that the combustion system may operate near a lean blow out (LBO) boundary. Lean blow out or weak extinction is the point at which the mixture of fuel and air is no longer flammable; for premixed multi-nozzle systems, weak extinction can be defined as the point at which there is a significant drop in the combustion efficiency and/or complete extinction of the flame. The LBO boundary or constraint, if violated, may result in partial or complete blowout (i.e., loss of the combustion flame). Controlling operation near an LBO boundary is even more difficult in a can-annular combustion system where the F/A ratio may be varied from one combustor can to another combustor can. More specifically, the variable F/A ratio may cause some combustor cans to operate with leaner F/A ratio than others and during operations, if an LBO boundary is violated, the can-to-can variability may lead to loss of flame in one or several combustor cans. Depending on the control logic within the system, when one or several combustor cans experience a loss of flame, the gas turbine protection system may shut the engine down to protect the entire system. However, such unexpected shutdowns may damage machinery and may cause large replacement power expenses to be incurred.

BRIEF DESCRIPTION OF THE INVENTION

In one aspect, a method of monitoring and controlling the combustion dynamics of a gas turbine engine system is provided. The system includes at least one gas turbine that includes at least one combustor can. The method includes receiving a signal from a gas turbine engine sensor that is indicative of combustion dynamics in at least one of the combustor cans, processing the received signal to determine a probability of lean blowout for at least one combustor can, and controlling the gas turbine engine system to facilitate reducing a probability of a lean blowout (LBO) event using the determined probability of lean blowout.

In another aspect, a gas turbine system is provided. The system includes a gas turbine engine including at least one combustor can, at least one of a combustor dynamics pressure sensor and flame sensor coupled to at least one of the combustor cans wherein the sensor is configured to monitor combustion in each respective can and transmit a signal indicative of combustion in each respective can, and at least one control system configured to receive the signal from said at least one sensor wherein the control system is programmed to filter the combustion signal to determine the presence of an LBO precursor, determine a probability of lean blowout (LBO) from the filtered signal, and control the gas turbine system to facilitate reducing the probability of lean blowout (LBO).

In yet another aspect, a computer program embodied on a computer readable medium for controlling a gas turbine engine system wherein the system includes a gas turbine engine that includes at least one combustor can. The computer program includes a code segment that receives user selection input data and then instructs the system to filter a gas turbine engine signal indicative of combustion in at least one of the combustor cans to only pass a portion of the signal that is between at least one of approximately ten Hz to approximately twenty five Hz, approximately eighty Hz to approximately one hundred and twenty Hz, and approximately one hundred thirty Hz to approximately one hundred sixty Hz, compare the filtered signal to a predetermined lean blowout threshold, and control the gas turbine engine system to facilitate reducing a probability of a lean blowout event using the comparison.

DETAILED DESCRIPTION OF THE INVENTION

While the methods and apparatus are herein described in the context of a gas turbine engine used in an industrial environment, it is contemplated that the method and apparatus described herein may find utility in other combustion turbine systems applications including, but not limited to, turbines installed in aircraft. In addition, the principles and teachings set forth herein are applicable to gas turbine engines using a variety of combustible fuels such as, but not limited to, natural gas, gasoline, kerosene, diesel fuel, and jet fuel. The description hereinbelow is therefore set forth only by way of illustration, rather than limitation.

Figure 1:
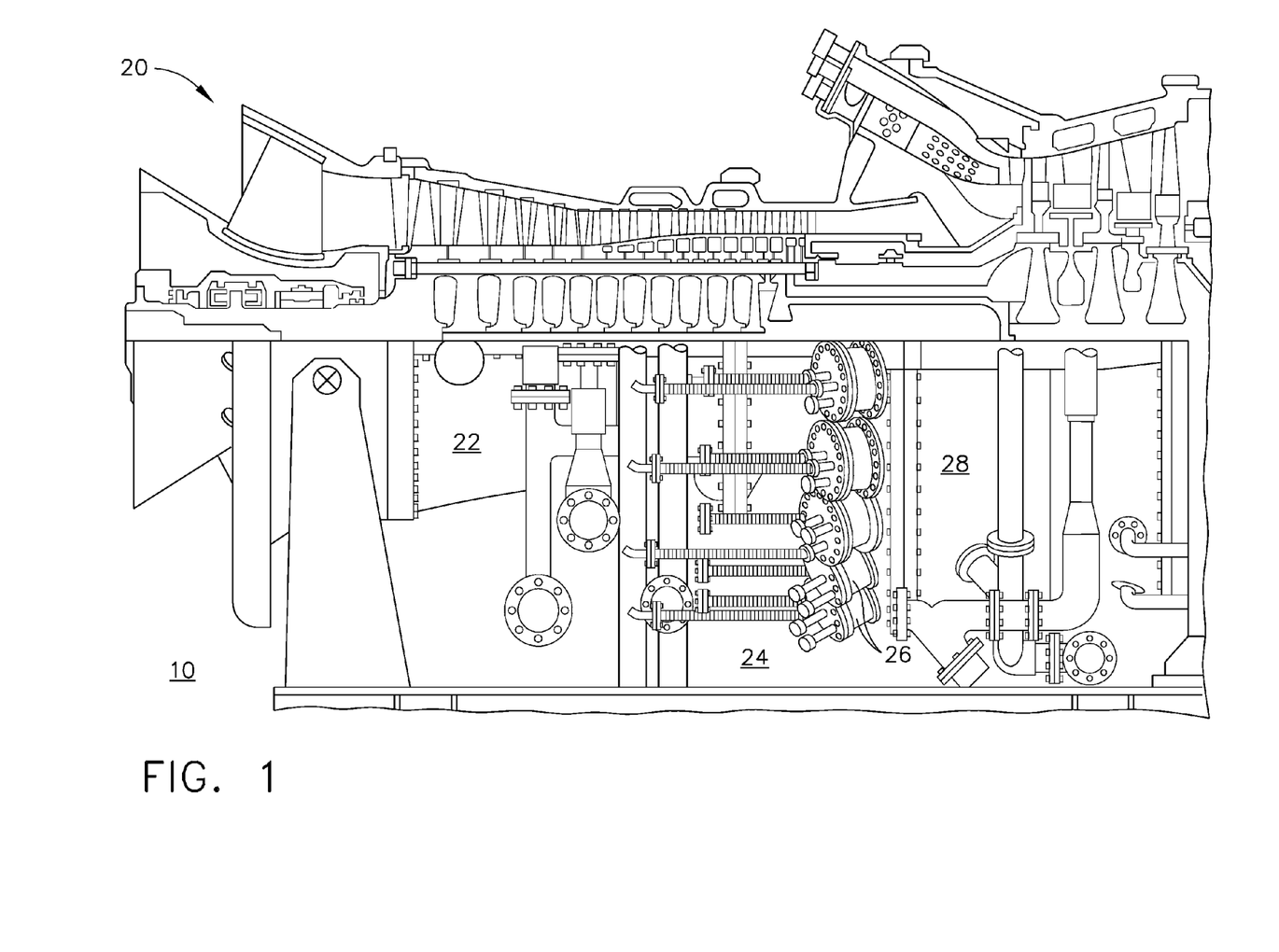
FIG. 1 is a side cutaway view of a gas turbine system that includes a gas turbine.

FIG. 1 is a side cutaway view of a gas turbine engine system 10 that includes a gas turbine engine 20. Gas turbine engine 20 includes a compressor section 22, a combustor section 24 including a plurality of combustor cans 26, and a turbine section 28 coupled to compressor section 22 using a shaft (not shown).

In operation, ambient air is channeled into compressor section 22 wherein the ambient air is compressed to a pressure greater than the ambient pressure. The compressed air is then channeled into combustor section 24 wherein the compressed air and a fuel are combined to produce a relatively high-pressure, high-velocity gas. Turbine section 28 extracts energy from the high-pressure, high-velocity gas discharged from combustor section 24, and the combusted fuel mixture is used to produce energy, such as, for example, electrical, heat, and/or mechanical energy. In one embodiment, the combusted fuel mixture produces electrical energy measured in kilowatt-hours (kWh). However, the present invention is not limited to the production of electrical energy and encompasses other forms of energy, such as, mechanical work and heat. Gas turbine engine system 10 is typically controlled, via various control parameters, from an automated and/or electronic control system (not shown) that is attached to gas turbine engine system 10.

Figure 2:
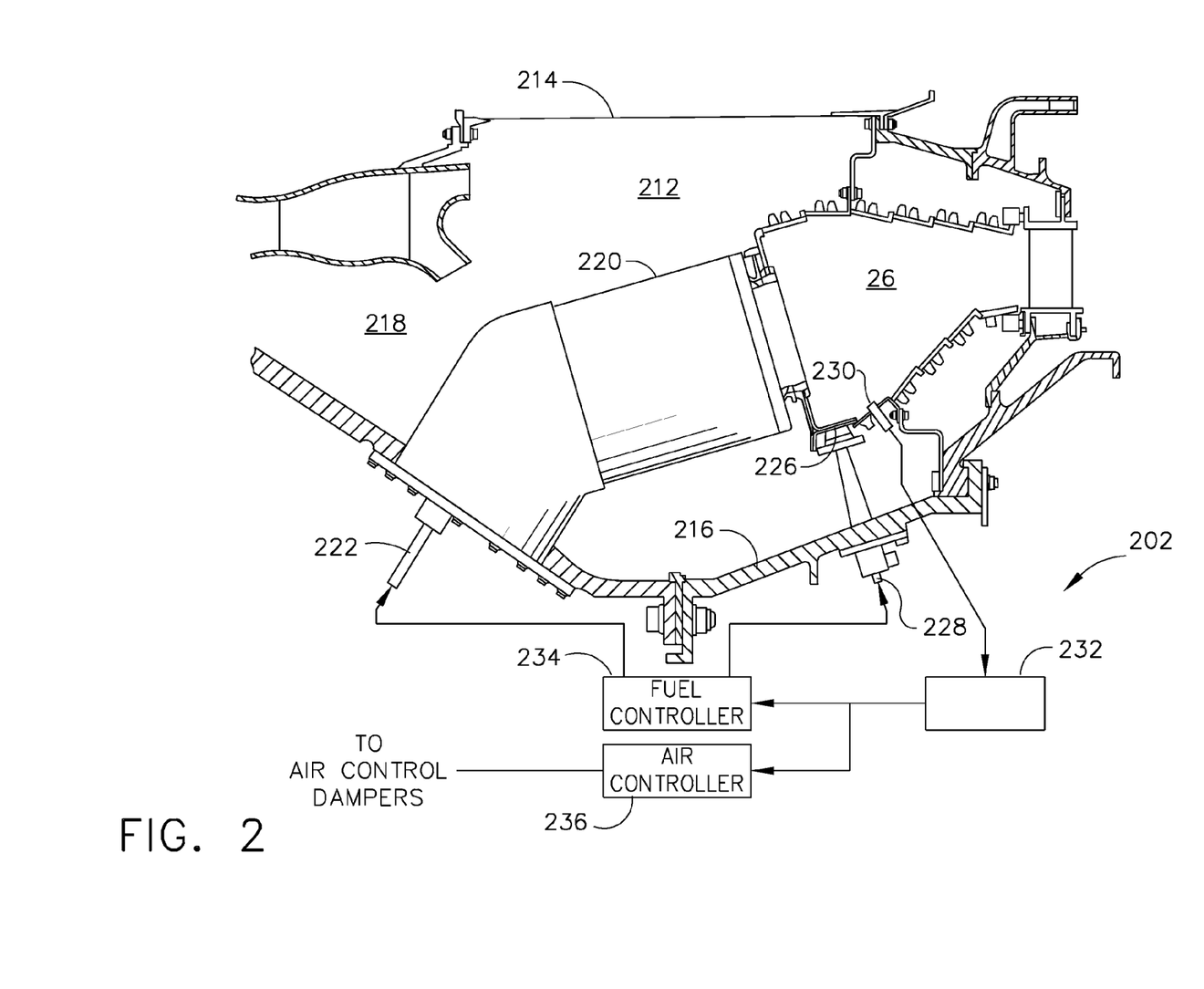
FIG. 2 is a schematic representation of a cross section of an exemplary gas turbine engine combustor can that may be used with the gas turbine engine shown in FIG. 1.

FIG. 2 is a schematic representation of a cross section of an exemplary gas turbine engine combustor can 26 and includes a schematic diagram of a portion of a gas turbine engine control system 202. An annular combustor 26 may be positioned within an annulus 212 between an inner engine casing 214 and an outer engine case 216. A diffuser 218 leads axially into annulus 212 from a compressor section 22 (shown in FIG. 1). Each combustor can 26 discharges to a turbine section 28 (shown in FIG. 1). A plurality of main fuel nozzles 220 are spaced circumferentially within annulus 212 to premix the main fuel with a portion of the air exiting diffuser 218 and to supply the fuel and air mixture to combustor 26. A plurality of main fuel supply conduits 222 supply fuel to main nozzles 220. A plurality of pilot fuel nozzles 226 supply pilot fuel to combustor 26 with a plurality of pilot fuel supply conduits 228 distributing fuel to pilot fuel nozzles 226. A plurality of igniters (not shown) may be positioned within the vicinity of pilot fuel nozzles 226 to ignite fuel supplied to pilot fuel nozzles 226.

A combustion sensor 230 may be positioned within combustor 26 to monitor pressure and/or flame fluctuations therein. Sensor 230 transmits signals indicative of combustion conditions within combustor can 26 to on-line gas turbine engine control system 202 that communicates with a fuel controller 234 that adjusts pilot fuel and main fuel flowrates to combustor 26 and with an air controller 236 that may control engine air control dampers (not shown).

Figure 3:
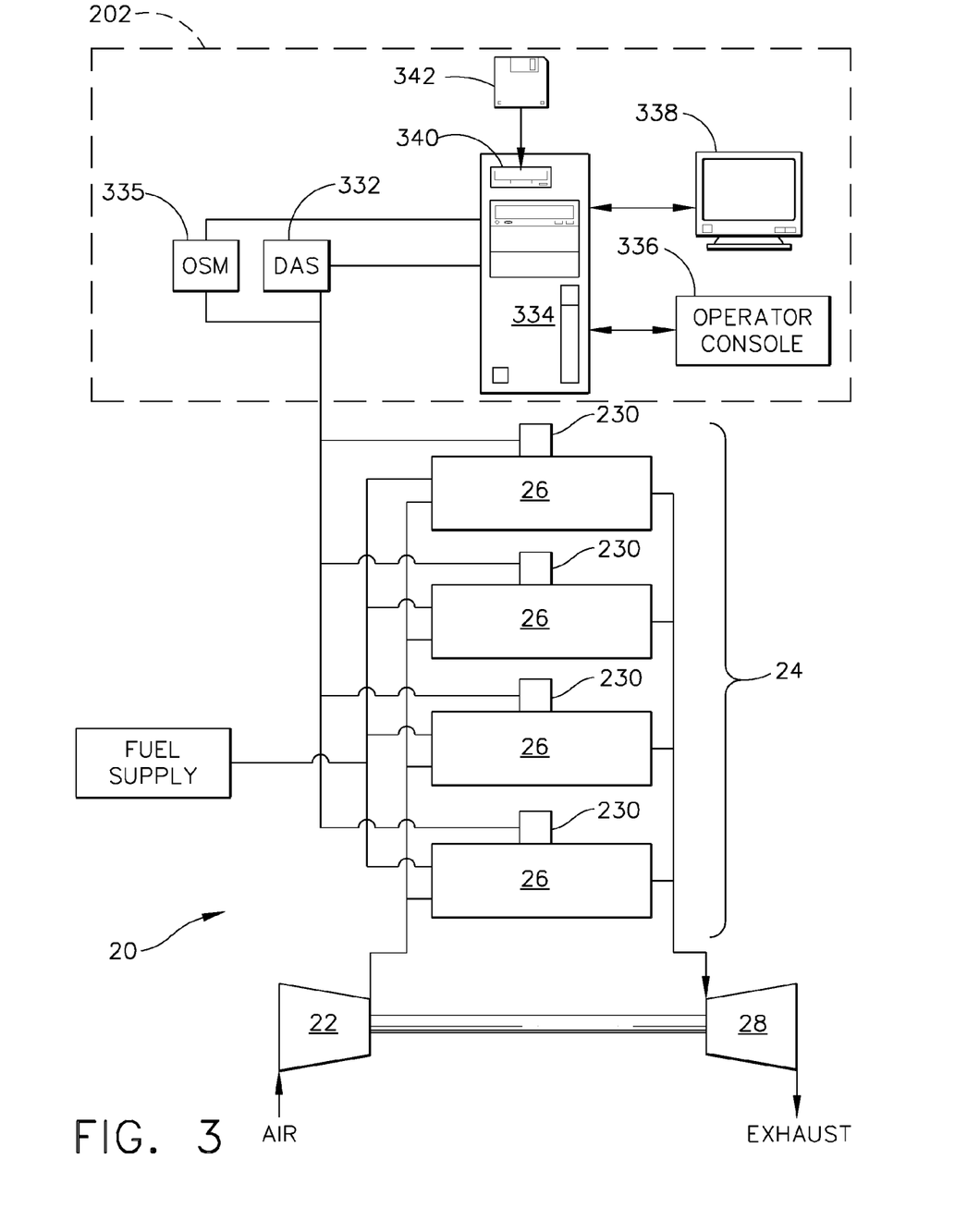
FIG. 3 is a schematic illustration of the gas turbine system shown in FIG. 1.

FIG. 3 is a simplified schematic illustration of gas turbine engine system 10 shown in FIG. 1. In the exemplary embodiment, gas turbine engine system 10 includes on-line gas turbine engine control system 202 that includes a data acquisition system (DAS) 332 that samples data from sensors 230 for subsequent processing. A computer 334 receives the sampled sensor data from DAS 332 and an onboard system monitor (OSM) 335, and performs high-speed data analysis. Although only four combustor cans 26 are shown, it should be realized that gas turbine engine system 10 can include more or less than four combustor cans 26, for example, in one exemplary embodiment, gas turbine engine system 10 includes twenty four combustor cans 26.

Computer 334 receives commands from an operator via a keyboard 336. An associated monitor 338 such as, but not limited to, a liquid crystal display (LCD) and a cathode ray tube, allows the operator to observe data received from computer 334. The operator supplied commands and parameters are used by computer 334 to provide control signals and information to DAS 332 and OSM 335. Although illustrated as individual components, it should be realized that computer 334, DAS 332, and OSM 335 may also be resident in the same device.

In one embodiment, computer 334 includes a device 340, for example, a floppy disk drive, CD-ROM drive, DVD drive, magnetic optical disk (MOD) device, or any other digital device including a network connecting device such as an Ethernet device for reading instructions and/or data from a computer-readable medium 342, such as a floppy disk, a CD-ROM, a DVD or another digital source such as a network or the Internet, as well as yet to be developed digital means. In another embodiment, computer 334 executes instructions stored in firmware (not shown). Computer 334 is programmed to perform functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein. Additionally, although the herein described methods and apparatus are described in an industrial setting, it is contemplated that the benefits of the invention accrue to non-industrial systems such as those systems typically employed in a transportation setting such as, for example, but not limited to, aircraft.

Figure 4:
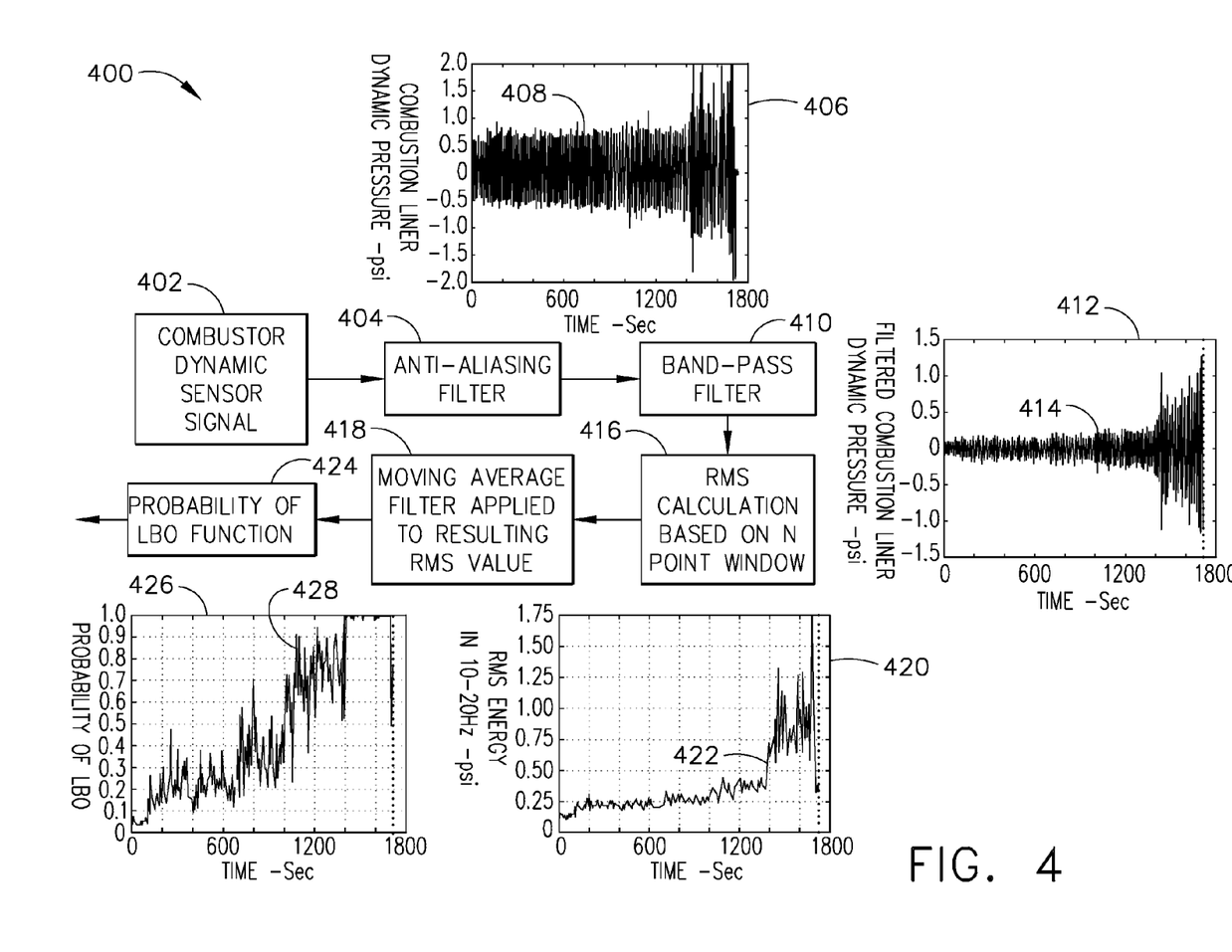
FIG. 4 is a data flow chart for an exemplary algorithm that may be used to monitor combustion dynamics in the engine shown in FIG. 1.

FIG. 4 is a data flow chart 400 for an exemplary algorithm that may be used to monitor combustion dynamics in gas turbine engine 20 (shown in FIG. 1). In the exemplary embodiment, a plurality of combustor dynamic sensor signals 402 are generated by sensors 230 coupled to each combustor can 26 that are configured to sense conditions within combustor can 26 and generate signals indicative of the conditions therein. In the exemplary embodiment, at least one sensor 230 is coupled to each combustor can 26 such that control system 202 receives signals indicative of combustion conditions in each can 26. In an alternative embodiment, not all combustor cans 26 include sensors 230. Control system 202 receives signals from a representative number of cans 26 and controls gas turbine engine system 10 based on the representative signals. This would also be the case in instances when each combustor can 26 includes a respective sensor 230, but one or more sensors 230 have failed in service. When any of sensors 230 fails in service, control system 202 is configured to detect the failure and modify control of gas turbine engine system 10 to disregard an erroneous input from the failed sensor 230. In one embodiment, sensors 230 are combustion dynamic pressure sensors. In an alternative embodiment, sensors 230 are flame sensors. Signals 402 are transmitted to control system 202 and are passed through an anti-aliasing filter 404 to facilitate preventing high frequency noise from being folded over into the lower frequency region of interest of signals 402. A graph 406 illustrates an exemplary trace 408 of the signal versus time after it has been filtered by anti-aliasing filter 404. The signal is band pass filtered 410 to yield data within a frequency band of interest. In one embodiment, the frequency band of interest is approximately thirty Hz to approximately zero Hz. In an alternative embodiment, the frequency band of interest is approximately twenty-five Hz to approximately five Hz. In another alternative embodiment, the frequency band of interest is approximately twenty Hz to approximately ten Hz. A graph 412 illustrates an exemplary trace 414 of the signal versus time after it has passed through band-pass filter 410. A root mean square 416 of the signal is then computed. In the exemplary embodiment, a N point sliding window is used to calculate the RMS of the signal in the sliding window. In the exemplary embodiment, N represents the number of data points used by the algorithm. This calculation is analogous to calculating the energy in the signal. In another embodiment, the energy may be calculated by using the coefficients resulting from an FFT operation. The resulting RMS signal is low pass filtered 418 using a moving average window. A graph 420 illustrates an exemplary trace 422 of the signal versus time after it has been filtered using a moving average window algorithm. The filtered RMS signal is then passed through a function 424 that yields a probability of LBO. A graph 426 illustrates an exemplary trace 428 of the signal versus time after function 424 has been applied to the filtered RMS signal. In the exemplary embodiment, function 424 uses a cumulative probability function of a normal distribution where the mean and variance are chosen to achieve a desired probability of LBO for a given RMS value. In an alternative embodiment, a wavelet transform is used to monitor the signal in the desired frequency range.

In the alternative embodiment described above, an AC component of the flame sensor signal is used to monitor the combustion conditions within combustor can 26. A frequency response of an AC component of flame sensor 230 may correlate to the combustor dynamics signal. Therefore, algorithm 400 for LBO precursor detection may also be applied to the AC component of the flame sensor signal to detect an impending LBO event.

When the probability of LBO signal has been generated it may be compared to a threshold boundary or signal to determine if an LBO event is impending, such as by the presence of the LBO precursor. Once the precursor is detected, control system 202 may manipulate one or a combination of control system parameters to move the operation of gas turbine engine system 10 away from the LBO boundary. The parameters may include, but are not limited to an increase in bulk fuel flow to gas turbine engine 20, a decrease in air flow to gas turbine engine 20, an increase in an inlet air temperature of one or more combustor cans 26, and changing a fuel split to the at least one combustor cans 26.

Figure 5:
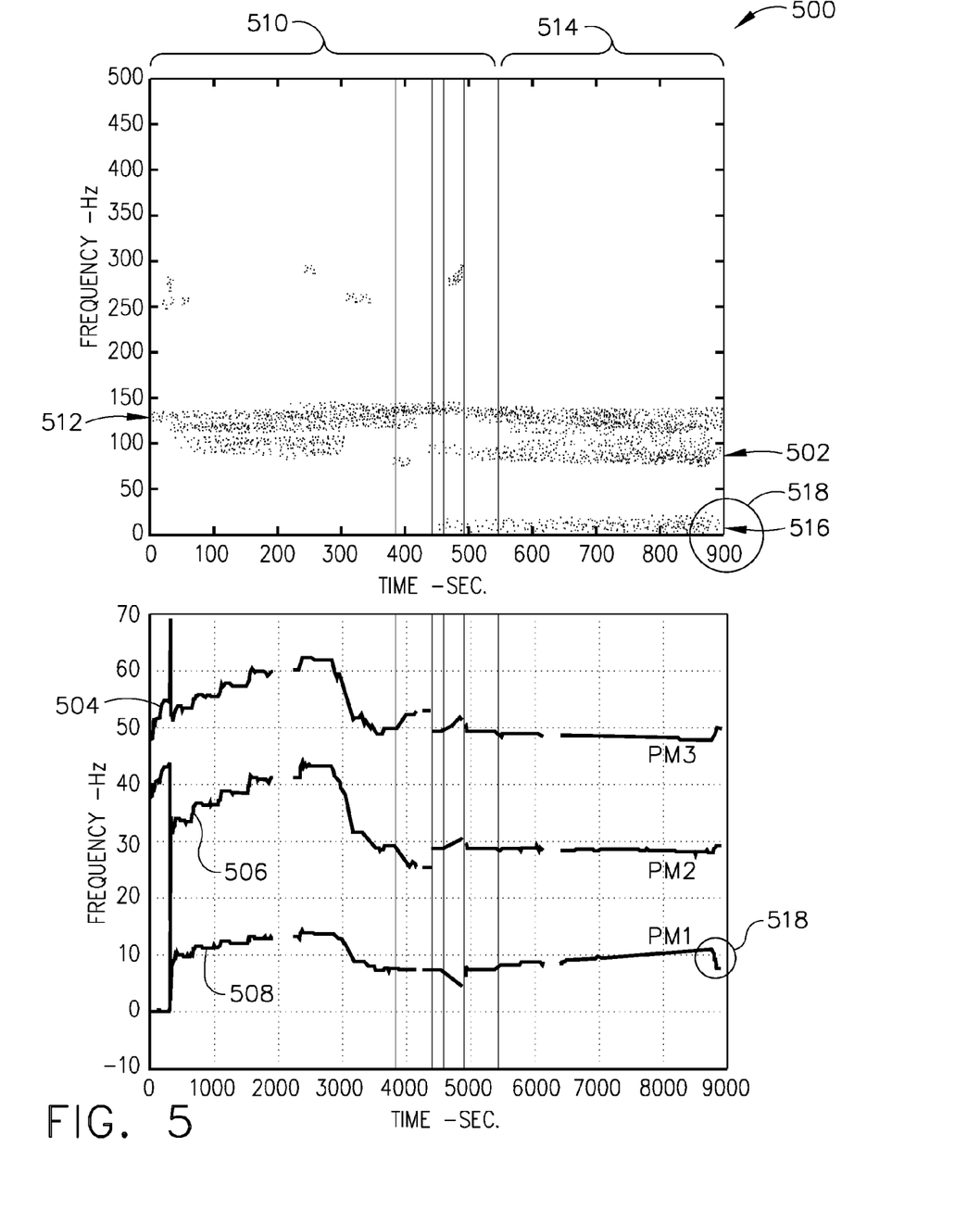
FIG. 5 is a graph illustrating exemplary traces of a field verification test of the gas turbine engine illustrating a fuel split effect on a lean blowout (LBO) precursor.

FIG. 5 is a graph 500 illustrating exemplary traces of a field verification test of fuel split effect on LBO precursor. A trace 502 illustrates a spectrogram of the combustion dynamic signal of one combustor can 26. A trace 504 and a trace 506 illustrate valve position to two fuel circuits and a trace 508 illustrates a valve position to a third fuel circuit 26. The time axis of each trace correlates to each other such that the effect on combustion dynamics shown in trace 502 may be correlated to valve position manipulations of the three fuel circuits. Graph 500 includes a first time period 510 wherein a dominant frequency band 512 of from approximately eighty Hz to approximately one hundred forty Hz is apparent. During a second time period 514, the fuel split is increased to bring gas turbine engine 20 closer to LBO. As gas turbine engine 20 is brought closer to LBO, indications in a precursor frequency band 516 begin to appear. The intensity of the indications in frequency band 516 increase as gas turbine engine 20 is moved closer to LBO. At period 518, the fuel split is decreased such that the operation of gas turbine engine 20 is moved away from an LBO, and accordingly the LBO indications in band 516 are substantially reduced and/or eliminated.

As the fuel/air ratio becomes leaner and the LBO boundary is approached, energy in frequency band 516 of the associated combustion dynamics signal increases. Frequency band 516 is not associated with dominant combustion frequency band 512. When the operation of gas turbine engine 20 is away from the LBO boundary, the energy in band 516 is similar to that of other frequencies that are not the dominant combustion frequency. Therefore, by appropriately monitoring frequency band 516, a precursor for LBO may be generated.

Although the fuel split is illustrated as being manipulated to effect an impending LBO and subsequent recovery from an impending LBO, other engine parameters may be adjusted depending on the operation of gas turbine engine 20 at the time of occurrence of the impending LBO. In the exemplary embodiment, a feedback control scheme is used where the control input, for example, one or a combination of the engine parameters discussed above, is changed to drive the probability of LBO below a predetermined threshold. The feedback control may include, but is not limited to, proportional (P), proportional-integral (PI), and proportional-integral-differential (PID), with appropriate maximum and/or minimum limits.

Figure 6:
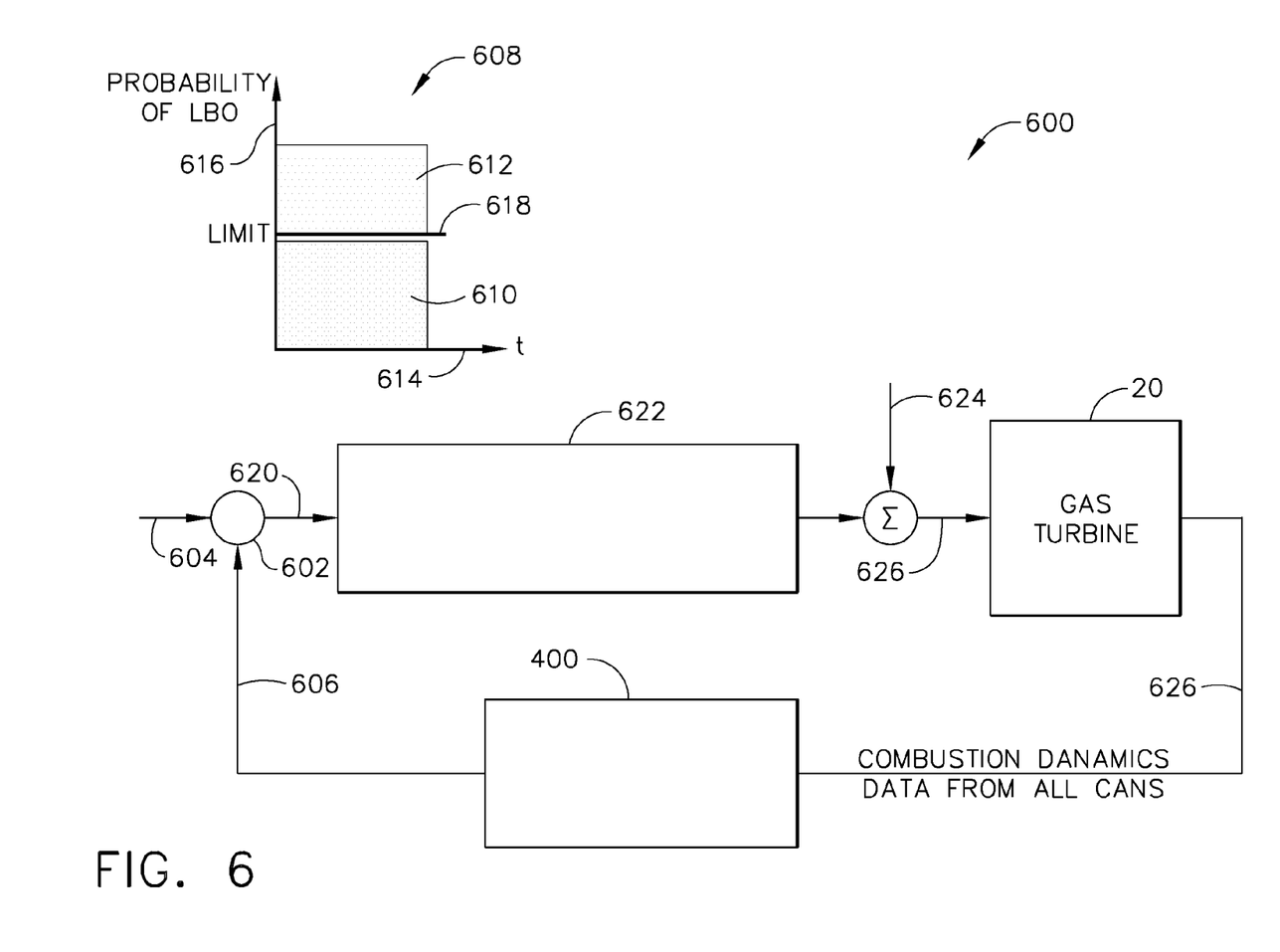
FIG. 6 is a block diagram of an exemplary LBO avoidance control module that may be used with the gas turbine engine system shown in FIG. 1.

FIG. 6 is a block diagram of an exemplary LBO avoidance control module 600 that may be used with gas turbine engine system 10 (shown in FIG. 1). Module 600 may be a standalone electronic component that is coupled to appropriate input and output signal lines of control system 202. Additionally, module 600 may be incorporated into control system 202 either as a hardware implementation of the functions described herein or as a software implementation of the functions. Module 600 includes a comparator 602 that compares a threshold or limit signal 604 to a signal indicative of the probability of LBO within the combustor cans 26. A graph 608 illustrates a first area 610 within which a control action to avoid LBO is not taken and a second area 612 wherein a control action to avoid LBO is initiated. An x-axis 614 of graph 608 represents time and a y-axis 616 represents the probability of LBO, such as signal 606. When the probability of LBO is less than a limit 618, for example when gas turbine engine 20 is operating in area 610 no action is taken to avoid LBO. When the probability of LBO is greater than limit 618, comparator 602 provides an output 620 to a feedback controller 622 that may manipulate one or a combination of engine parameters that includes, but is not limited to, total fuel flow to gas turbine engine 20, total air flow to gas turbine engine 20, inlet air temperature to combustors 26, and fuel nozzle split. An output of feedback controller 622 is summed with control signals 624 transmitted to the controllers (not shown) controlling the engine parameters. The summed signals are transmitted to gas turbine engine 20 where the controllers manipulate at least one of total fuel flow to gas turbine engine 20, total air flow to gas turbine engine 20, inlet air temperature to combustors 26, and fuel nozzle split to reduce the probability of LBO. Manipulation of the engine parameters alters the combustion conditions in combustor cans 26, which are monitored by sensors 230. Signals 626 indicative of combustion conditions within cans 26 are generated by sensors 230 and transmitted to algorithm 400, where the probability of LBO under the altered combustion conditions is determined for input into comparator 602.

By appropriate signal processing of the combustion dynamics signal, a precursor to lean blow out (LBO) may be identified and the probability of LBO may be computed. The precursor serves as an early warning for an impending LBO event. When the probability of an impending LBO event exceeds a predetermined threshold, corrective actions may be taken to avoid the LBO event. Corrective actions may include changing the engine fuel-to-air ratio (F/A) by manipulation of the fuel flow or air flow, increasing the temperature of the air entering combustors 26, and changing the fuel split between the various nozzles in combustor can 26. By using the LBO detection and control algorithm, machine trips due to loss of flame caused by poor F/A distribution may be avoided. Additionally, processing of the combustion dynamics signal of each combustor can 26 permits facilitating correction of can-to-can variability, and gas turbine engine 20 can be protected from an LBO trip due to one or several cans 26 having a lower F/A ratio when compared to the rest of the system.

Figure 7:
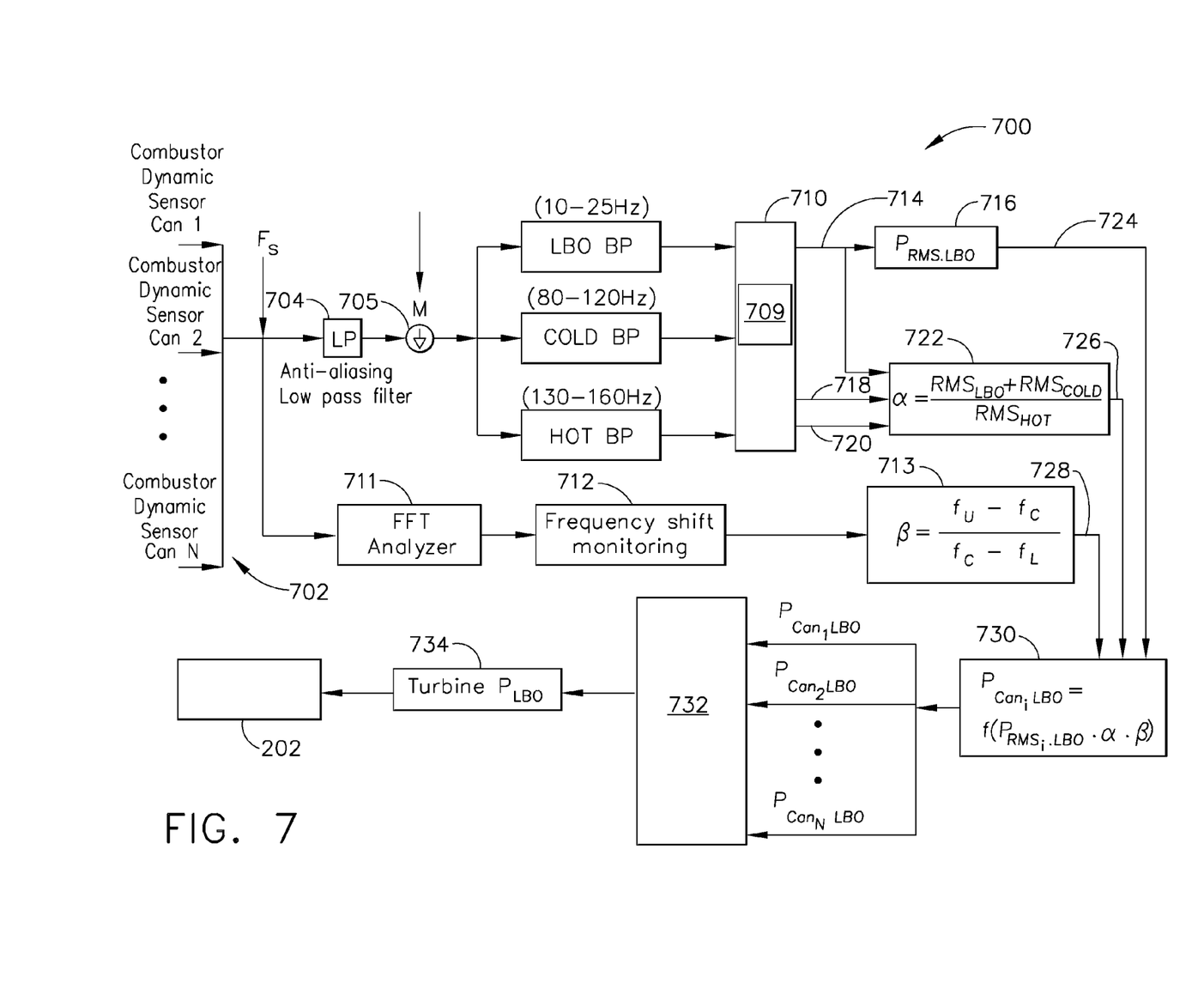
FIG. 7 is a data flow chart for an alternative algorithm that may be used in an another embodiment of the control system shown in FIG. 2.

FIG. 7 is a data flow chart 700 for an alternative algorithm that may be used in an another embodiment of control system 202 (shown in FIG. 2) to monitor combustion dynamics in gas turbine engine 20 (shown in FIG. 1).

The algorithm illustrated in data flow chart 700 includes three main parts, a RMS signal extraction of different tones, frequency tracking of a dominant combustion tone and a LBO probability calculation. The detection logic is based on a spectral observation of a dynamics signal from at least one combustor can and using evidentiary signatures incipient to an LBO event. In the exemplary embodiment, gas turbine engine 20 is a 7FA engine, commercially available from General Electric Company, Greenville, S.C., which has 14 cans and may generate at least three tones, a LBO tone (10-25 Hz), and two dominant combustion tones, a low fuel/air (F/A) tone (80-120 Hz) that is correlative to a relatively lower F/A ratio and a high fuel/air (F/A) tone (130-160 Hz) that is correlative to a relatively higher F/A ratio. These evidential signatures include energy changes in the different tones: LBO tone (10-25 Hz), low F/A tone (80-120 Hz) and high F/A tone (around 130-160 Hz) and frequency shifting of the high F/A tone as the combustor approaches LBO.

In the exemplary embodiment, a plurality of combustor dynamic sensor signals 702 are generated by sensors 230 (shown in FIG. 2) coupled to each combustor can 26 that are configured to sense conditions within combustor can 26 and generate signals indicative of the conditions therein. In the exemplary embodiment, at least one sensor 230 is coupled to each combustor can 26 such that control system 202 receives combustor dynamic sensor signals 702 indicative of combustion conditions in each can 26. In an alternative embodiment, not all combustor cans 26 include sensors 230. Control system 202 receives combustor dynamic sensor signals 702 from a representative number of cans 26 and controls gas turbine engine system 10 based on the representative combustor dynamic sensor signals 702. This would also be the case in instances when each combustor can 26 includes a respective sensor 230, but one or more sensors 230 have failed in service. When any of sensors 230 fails in service, control system 202 is configured to detect the failure and modify control of gas turbine engine system 10 to disregard an erroneous input from the failed sensor 230. In one embodiment, sensors 230 are combustion dynamic pressure sensors. In an alternative embodiment, sensors 230 are flame sensors. Combustor dynamic sensor signals 702 are sampled at a relatively high frequency $F_s$ and transmitted to control system 202 and are passed through an anti-aliasing low pass filter 704 to facilitate preventing high frequency noise from being folded over into the lower frequency region of interest of signals 702. Coefficients of anti-aliasing low pass filter 704 may be designed in a second order section structure as is the exemplary embodiment. In the exemplary embodiment, a three dB cutoff frequency is at an upper bound of a frequency region of interest, for example, 200 Hz. If sampling frequency $F_s$ changes, coefficients of anti-aliasing low pass filter 704 may be re-selected so that the three dB cutoff frequency remains at the upper bound of the frequency region of interest.

The anti-aliased combustor dynamic sensor signals 702 are then passed through a decimator 705 to facilitate reducing a computational load of the algorithm. Decimator 705 down samples combustor dynamic sensor signals 702 recorded at high frequency, for example, in a kiloHz (kHz) range, to a relatively more processor-manageable frequency, for example in a Hz range, for RMS value calculation. The decimate rate or the down sampling rate M may be selected such that the down sampled frequency is greater than the twice the frequency range of interest. In the exemplary embodiment, the frequency of interest may be up to approximately 200 Hz. Accordingly, M may be chosen to down sample the rate to a value greater than approximately 400 Hz. As the sampling frequency, $F_s$ changes, M may be adjusted accordingly. For example, if $F_s$=twenty four kHz, then the decimator rate may be chosen as M=48 to bring the sampling rate down to approximately five hundred Hz.

The window size (number of samples) for the RMS calculation may be selected to provide a predetermined resolution that is fine enough to facilitate tracking the RMS value over time and may be synchronized with a high F/A tone frequency tracking in time, discussed in detail below.

The decimated signal may be then filtered through a plurality of band pass filters. In the exemplary embodiment, the anti-aliased signal is band pass filtered by three Butterworth filters coupled in parallel. A LBO band-pass filter 706 filters out an LBO tone from the decimated signal. The LBO tone of interest is within a range of approximately ten Hz to approximately twenty-five Hz. A low F/A tone band-pass filter 707 filters out a low F/A tone from the decimated signal. The low F/A tone of interest is within a range of approximately eighty Hz to approximately one hundred twenty Hz. A high F/A tone band-pass filter 708 filters out a high F/A tone from the decimated signal. The high F/A tone of interest is within a range of approximately one hundred thirty Hz to approximately one hundred sixty Hz. Coefficients of the bandpass filters 706, 707, and 708 may be selected in second order section structure as an exemplary embodiment. The sampling frequency of these filters is the down sampled frequency received from decimator 705.

An RMS value of each band-pass filtered signals is then computed and low pass filtered to reduce noise by using a moving average filter 709 in a RMS calculator 710. In the exemplary embodiment, a moving average filter size for RMS calculator 710 to facilitate RMS value smoothing is set to 5 samples. In an alternative embodiment, other moving average filter size may be selected wherein increasing the moving average filter size may enhance noise reduction. However, increasing the moving average filter size may also introduce additional time delay.

Alternatively, the output of an FFT calculation may be used wherein the output coefficients are used to establish an amount of energy in the various frequency bands.

Concurrently with computing tones corresponding to LBO tone, low F/A tone, and high F/A tone, a high F/A tone component of the signal sampled at frequency, $F_s$ is monitored for a frequency shift in the high F/A tone using a windowed Fast Fourier Transform (FFT) module 711 and a frequency shift monitor 712 by applying non-overlapping Hanning window FFT computation on the time domain raw acoustics signal. Windowed FFT is a narrow time Fourier transformation that is based on recalculation of the FFT with a variable shifting of the initial complexes in time, allowing the generation of various representations of spectral changes. The FFT window size sets the time resolution at a particular sampling frequency. For example, a window size of 8192 points gives a 0.64 second time resolution at a 12.8 KHz sampling rate. In the exemplary embodiment, the down sampling rate M and RMS window size are selected based on synchronization considerations for the RMS value vectors and the high F/A tone frequency vector. In an alternative embodiment, interpolation is used to align the frequency shift vector with the RMS value in time. Setting the number of FFT scans to be averaged to a value greater than one may provide a less noisy frequency tracking, however, it may increase the computational time used. Using a window overlap may increase time resolution and thus, improve the accuracy of frequency tracking, however, again, using the overlap may introduce a time delay. In the exemplary embodiment, the lower bound and the higher bound of the high F/A tone are set to match the high F/A tone band pass filter settings. An output of frequency shift monitor 712 is transmitted to a beta calculation module 713.

A LBO RMS output 714 of RMS calculator 710 is coupled to LBO probability module 716 wherein a LBO probability, $P_{RMSiLBO}$ (Note. subscript i takes values from 1 to number of cans) is calculated using the LBO tone RMS value using a predefined statistical model. The probability is then enhanced by two pieces of evidential information, $\alpha$ and $\beta$, which are a RMS ratio and a frequency shift of the high F/A tone respectively. The enhanced LBO probability is then subjected to nonlinear normalization between 0 and 1 using, for example, a sigmoid function. In an exemplary embodiment, another nonlinear function may be used. A cumulative probability function of a normal distribution is used and the mean and variance are preselected to achieve a desired probability of LBO for a given RMS value of the LBO tone. For example, a threshold for a 95% probability of a LBO event may be tuned using the RMS value of the LBO tone. The mean and variance of the statistical model may be tuned using historical LBO data of the respective gas turbine engine system 10. LBO RMS output 714, a low F/A tone RMS output 718, and a high F/A tone RMS output 720 are transmitted to an alpha calculation module 722.

The LBO probability, $P_{RMSiLBO}$ may be enhanced by combining an output 724 of LBO probability module 716 with an output 726 of alpha calculation module 722, and an output 728 of beta calculation module 713 in a sigmoid function module 730.

An RMS ratio, a, reflects a relative change in the three tones wherein $$\alpha = \frac{RMS_{LBO} + RMS_{LowF/A}}{RMS_{HighF/A}},$$

where $RMS_{LBO}$ is LBO RMS output 714, $RMS_{Low\,F/A}$ is low F/A tone RMS output 718, and $RMS_{HIGH\,F/A}$ is high F/A tone RMS 720. RMS ratio $\alpha$ is typically hard limited using a predetermined threshold to maintain a predetermined resolution after the probability is normalized. The threshold may be tuned by using historical LBO data.

A frequency shift, $\beta$, of the high F/A tone may be defined as:

$$\beta = \frac{f_U - f_C}{f_C - f_L},$$

where $f_U$ is an upper bound of the high F/A tone frequency, $f_L$ is a lower bound of the high F/A tone frequency and $f_C$ is an instantaneous center frequency of the high F/A tone. The parameters $f_U$ and $f_L$ may be selectively set to the cutoff frequencies of high F/A tone bandpass filter 708.

LBO probability 724, which is based on the RMS value of the LBO tone for each combustor can 26 may be enhanced and normalized between zero and one using sigmoid function module 730 as:

$$P_{Can_i \cdot LBO} = f_{sigmoid}(P_{RMS_i LBO} \cdot \alpha \cdot \beta)$$

for each combustor can 26. Parameter $\alpha$ may be hard limited to maintain a predetermined can LBO resolution after the $P_{Can\,i\,LBO}$ is normalized. The parameters, $Q_0$, $Q_1$ that control the mapping performance of sigmoid function can be adjusted to map the enhanced probability value at the maximum value of $\alpha \times \beta$ to 1 in the following equation:

$$P_{Can_i \cdot LBO}(t) = 1 \bigg/ \left(1 + e^{-(2(P_{RMS_i \cdot LBO}(t) \cdot \alpha \cdot \beta) - Q_1)/Q_0}\right)$$

Each calculated $P_{Can\,i\,LBO}$ may be output to a maximum probability module 732 where a maximum instantaneous probability amplitude of each calculated $P_{Can\,i\,LBO}$ may be determined and transmitted to a gas turbine LBO probability module 734. The gas turbine LBO probability Turbine $P_{LBO}$ may be transmitted to gas turbine engine control system 202 for feedback to facilitate initiation of corrective action to avoid a LBO. Control system 202 may manipulate one or a combination of control system parameters to move the operation of gas turbine engine 20 away from the LBO boundary. The parameters may include, but are not limited to an increase in bulk fuel flow to gas turbine engine 20, a decrease in air flow to gas turbine engine 20, an increase in an inlet air temperature of one or more combustor cans 26, and changing a fuel split to the at least one combustor cans 26.

In the alternative embodiment described above, an AC component of the flame sensor signal is used to monitor the combustion conditions within combustor can 26. A frequency response of an AC component of flame sensor 230 may correlate to the combustor dynamics signal. Therefore, algorithm 700 for LBO precursor detection may also be applied to the AC component of the flame sensor signal to detect an impending LBO event.

Figure 8:
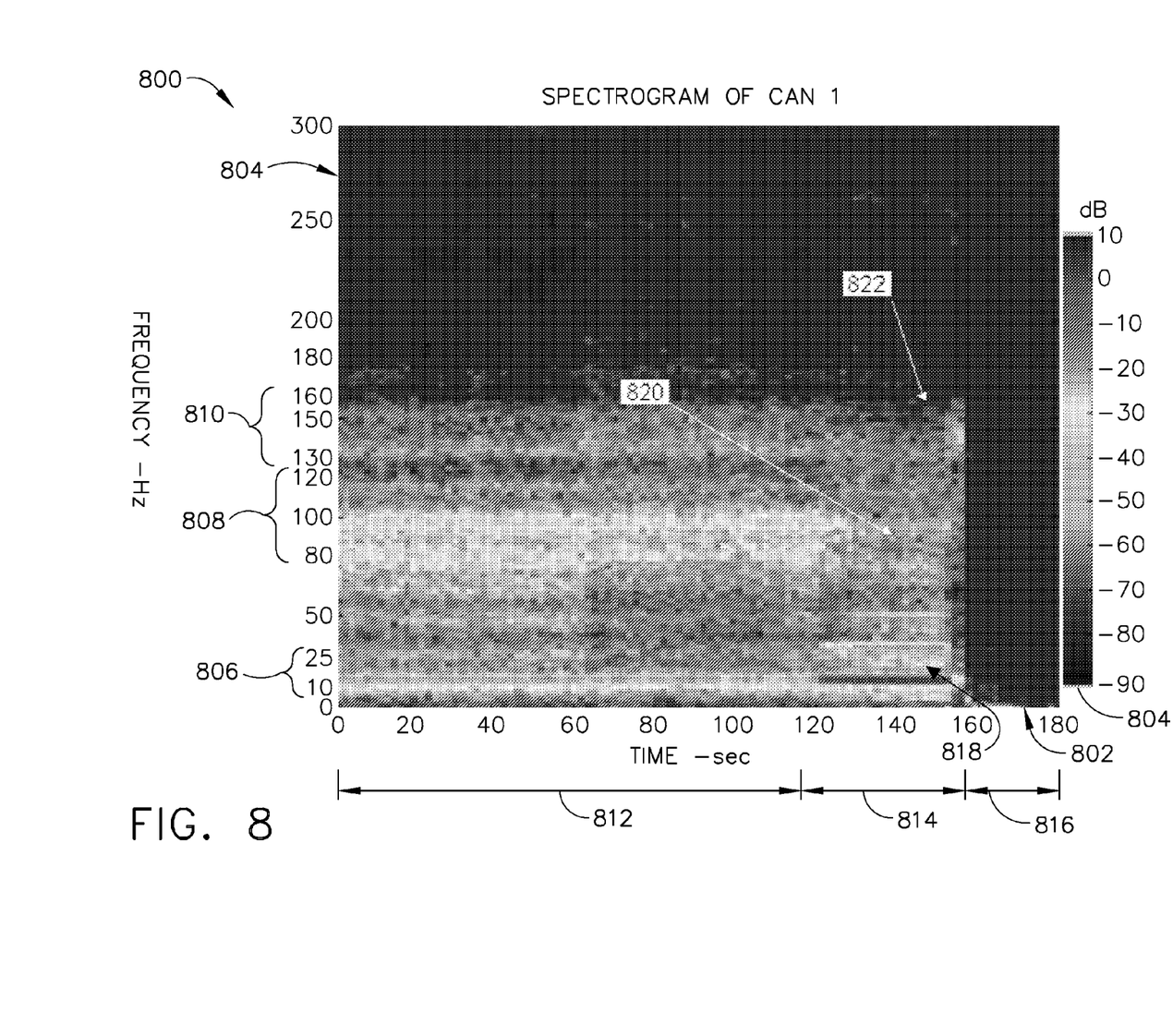
FIG. 8 is an illustration of an exemplary spectrogram of dynamics of a combustor can that may be used with the gas turbine engine shown in FIG. 1.

FIG. 8 is an illustration of an exemplary spectrogram 800 of dynamics of a combustor can 26 that may be used with gas turbine engine 20 (shown in FIG. 1). Spectrogram 800 includes a x-axis 802 referenced in units of time (seconds) and a y-axis 804 referenced in units of frequency (Hz). Spectrogram 800 illustrates an energy level associated with frequencies sampled from each combustor can 26 of gas turbine engine 20. As the energy level corresponding to a specific frequency increases, for example, the intensity of the illustrated associated pixel increases such that darker pixels indicate higher energy levels than lighter pixels. An LBO frequency band 806 of approximately ten Hz to twenty five Hz corresponds to a LBO tone. A low F/A frequency band 808 of approximately eighty Hz to one hundred twenty Hz corresponds to a low F/A tone. A high F/A frequency band 810 of approximately one hundred thirty Hz to one hundred sixty Hz corresponds to a high F/A tone. Spectrogram 800 illustrates combustor dynamics over an operation period 812, an LBO onset period 814, and a post engine trip period 816. Spectrogram 800 illustrates relatively constant amplitudes of energy in each of frequency bands 806, 808, and 810 during operation period 812. During LBO onset period 814, the energy shown in LBO frequency band 806 increases indicating a strengthening of the LBO tone 818. Additionally, the energy shown in low F/A frequency band 808 decreases, indicating a weakening of the low F/A tone 820, and the energy shown in high F/A frequency band 810 decreases indicating a weakening of the high F/A tone 822. The energy of the high F/A tone also decreases in frequency during LBO onset period 814.

The above-described methods and apparatus provide a cost-effective and reliable means for monitoring combustion dynamics and controlling combustion in a gas turbine engine. More specifically, the methods facilitate determining an LBO precursor in each combustor can and determining corrective actions to move engine operations away from an LBO threshold. As a result, the methods and apparatus described herein facilitate gas turbine engine operation in a cost-effective and reliable manner.

An exemplary methods and apparatus for monitoring and controlling combustion dynamics of a gas turbine engine are described above in detail. The apparatus illustrated is not limited to the specific embodiments described herein, but rather, components of each may be utilized independently and separately from other components described herein. Each system component can also be used in combination with other system components.

A technical effect of the method and apparatus is to provide a system that continuously monitors gas turbine engine operations to detect an approach to LBO and automatically modify the operation of the gas turbine engine to facilitate reducing the probability of a LBO event.

While the invention has been described in terms of various specific embodiments, those skilled in the art will recognize that the invention can be practiced with modification within the spirit and scope of the claims.

What is claimed is:

1. A gas turbine system comprising:
   a gas turbine engine comprising at least one combustor can;
   at least one of a combustor dynamic pressure sensor and flame sensor coupled to at least one of said combustor cans, said sensor configured to monitor combustion in each said respective can and transmit a signal indicative of combustion in each said respective can; and
   at least one control system configured to receive the signal from said at least one sensor, said control system programmed to:
   filter the combustion signal to determine the presence of a LBO precursor;
   determine a probability of lean blowout (LBO) from the filtered signal;
   compare the filtered signal to a predetermined LBO threshold; and
   control said gas turbine system to facilitate reducing the probability of lean blowout (LBO).

2. A gas turbine system in accordance with claim 1 wherein said control system is further configured to:
   filter the received signal to only pass a portion of the signal that is between approximately ten Hz and approximately twenty Hz; and
   compute a root mean square (RMS) of the filtered signal.

3. A gas turbine system in accordance with claim 1 wherein said control system further comprises a plurality of bandpass filters configured to pass a portion of the received signal that is between at least one of approximately ten Hz to approximately twenty five Hz, approximately eighty Hz to approximately one hundred and twenty Hz, and approximately one hundred thirty Hz to approximately one hundred sixty Hz.

4. A gas turbine system in accordance with claim 1 wherein said control system is further configured to monitor a frequency shift of a portion of the received signal that is between approximately one hundred thirty Hz to approximately one hundred sixty Hz.

5. A gas turbine system in accordance with claim 1 wherein said control system is further configured to at least one of:
   change a bulk fuel flow rate to the engine;
   change a air flow rate to at least one combustor can;
   change an inlet air temperature of at least one combustor can; and
   modify a fuel split to a respective at least one combustor can, to facilitate reducing the probability of lean blowout (LBO).

6. A gas turbine system in accordance with claim 1 wherein said control system further comprises a plurality of bandpass filters configured to pass a portion of the signal that corresponds to a fuel/air ratio that is greater than a fuel/air ratio during normal engine operation.

7. A gas turbine system in accordance with claim 2 wherein said control system is further configured to compute a root mean square (RMS) of the filtered signal based on at least one of an N point sliding window algorithm, wherein N represents the number of data points used by the algorithm, and a moving average window low-pass filter to the RMS signal.

8. A gas turbine system in accordance with claim 2 wherein said control system is further configured to determine a probability of lean blowout (LBO) from the filtered signal based on at least one of applying a cumulative probability function of a normal distribution to the filtered RMS signal, wherein a mean and a variance of the normal distribution are selectable to achieve a predetermined probability of LBO for each amplitude, and applying a wavelet transform to the filtered RMS signal in a predetermined frequency range.

9. A gas turbine system in accordance with claim 2 wherein said control system is further configured to determine a probability of lean blowout (LBO) from the filtered signal based on a relative change in amplitude between a plurality of tones of the combustion dynamics.

10. A gas turbine system in accordance with claim 9 wherein the relative change in amplitude between a plurality of tones includes at least one of:
    a relative change in amplitude between a lean blowout tone and at least one combustion tone;
    a relative change in amplitude between a lean blowout tone and at least one of a low F/A tone and a high F/A tone of the combustion dynamics; and
    a relative change in RMS amplitude between a lean blowout tone, a low F/A tone, and a high F/A tone of the combustion dynamics.

11. A gas turbine system in accordance with claim 10 wherein the relative change in RMS amplitude between a lean blowout tone, a low F/A tone, and a high F/A tone of the combustion dynamics is determined using:

$$\alpha = \frac{RMS_{LBO} + RMS_{LowF/A}}{RMS_{HighF/A}}, \text{wherein}$$

α represents the relative change between a lean blowout tone, a low F/A tone, and a high F/A tone;

$RMS_{LBO}$ represents the RMS amplitude of the LBO tone;

$RMS_{Low\ F/A}$ represents the RMS amplitude of the low F/A tone; and $RMS_{HIGH\ F/A}$ represents the RMS amplitude of the high F/A tone.

12. A gas turbine system in accordance with claim 1 wherein said control system is further configured to determine a probability of lean blowout (LBO) from the filtered signal based on a frequency shift of at least one of a high F/A tone and a low F/A tone.

13. A gas turbine system in accordance with claim 12 wherein the frequency shift of at least one of a high F/A tone and a low F/A tone is determined using:

$$\beta = \frac{f_U - f_C}{f_C - f_L}, \text{ wherein}$$

$f_u$ represents an upper bound of the high F/A tone frequency, $f_L$ represents a lower bound of the high F/A tone frequency, and $f_c$ represents an instantaneous center frequency of the high F/A tone.

14. A gas turbine system in accordance with claim 1 wherein said control system is further configured to determine a probability of lean blowout (LBO) from the filtered signal based on:

a combination of a probability of LBO with at least one of a relative change in amplitude between a plurality of tones of the combustion dynamics and a frequency shift of a high F/A tone of the combustion dynamics; and a normalization of the combination using a sigmoid function.

15. A gas turbine system in accordance with claim 14 wherein said control system is further configured to determine a probability of lean blowout (LBO) from the filtered signal based on a determination of a maximum instantaneous probability of LBO for each of the at least one combustor cans from each normalized combination.

16. A gas turbine system in accordance with claim 2 wherein said control system is further configured to determine a probability of lean blowout (LBO) from the filtered signal based on the application of a cumulative probability function of a normal distribution to the filtered RMS signal wherein a mean and a variance of the normal distribution are selectable to achieve a predetermined probability of LBO for each amplitude.

* * * * *